Dec. 27, 1960 D. SILLMAN ET AL 2,966,545
TELEVISION CIRCUIT
Filed Feb. 25, 1957
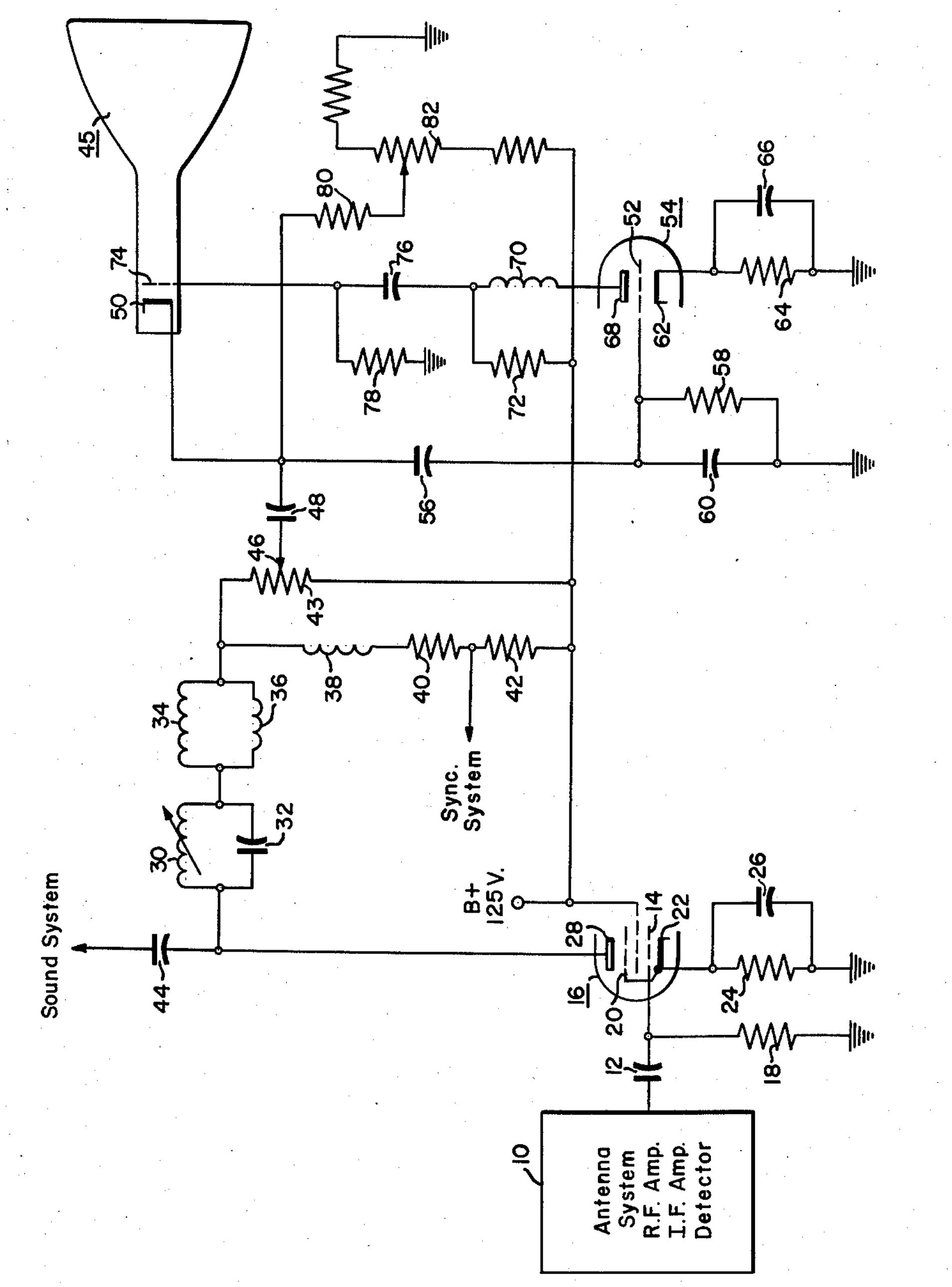
WITNESSES
Edwin E. Bassler
Robert C. Baird
INVENTORS
David Sillman &
Harry T. Stanley.
BY J. J. Callahan
ATTORNEY United States Patent Office 2,966,545

Patented Dec. 27, 1960

2,966,545

TELEVISION CIRCUIT

David Sillman, Metuchen, and Harry T. Stanley, Lincroft, N.J., assignors to Westinghouse Electric Corporation, East Pittsburgh, Pa., a corporation of Pennsylvania Filed Feb. 25, 1957, Ser. No. 642,066

3 Claims. (Cl. 178—7.5)

The present invention relates to an improved television receiver circuit, and more particularly, to a video output circuit for a television receiver.

In order to realize a cost reduction in the power supply of television receivers, it is desirable to operate the video amplifier at a low D.C. voltage, such as 125 volts D.C. Where a pentode type electron discharge device is used as a video amplifier, its reduced plate swing at low plate voltages makes it difficult to obtain sufficient video output voltage to be commercially acceptable. Presently available pentode tubes useful for video amplifier use, when used with large plate voltage swings, introduce excessive non-linearity distortion into the amplified video signal. Additionally, if the pentode device is used for amplification of an intercarrier sound signal, there is considerable cross-modulation of the sound signal by the video signal.

The present invention provides a video amplifier output stage comprising a pair of signal translating devices in which the output of one of the devices is coupled to an input electrode of a cathode ray tube picture reproducing device and to the input of the other device, and in which the output of the latter device is coupled to another input electrode of the cathode ray tube. The output signals of the pair of signal translating devices are applied with opposite polarity in push-pull fashion to two input electrodes of the cathode ray picture tube. The total effective output of the output stage is therefore equal to the sum of the outputs of the pair of electron discharge tubes.

It is therefore an object of the present invention to provide an improved video output circuit for a television receiver which operates at low D.C. voltage.

It is another object of the invention to provide an improved video output circuit permitting increased contrast while operating at a low D.C. voltage.

It is still another object of the invention to provide a video output circuit including a pair of signal translating devices which provides substantially double the normal signal voltage output for a given operating voltage.

It is still another object of the invention to provide a video output circuit including a pair of signal translating devices in which the output of each device is coupled to input electrodes of a cathode ray tube picture reproducing device in push-pull fashion.

It is still another object of the invention to provide a video output circuit including a pair of signal translating devices in which the output of one device is coupled to an input electrode of the cathode ray tube and to an input electrode of the other device, and in which the output of the latter device is coupled to another input electrode of the cathode ray tube.

It is still another object of the invention to provide a video output circuit of the above type in which one of the electron discharge devices is utilized for amplification of the intercarrier sound signal.

These and other objects are effected by our invention as will be apparent from the following description taken in accordance with the accompanying drawing which illustrates a television receiver embodying our invention.

Referring now to the drawing, there is shown a television receiver circuit having a video output circuit in accordance with the invention. As a single block 10, we have shown the portions of the receiver which precede the video output circuit. Thus, the receiver includes an antenna system, a radio frequency amplifier, an intermediate frequency amplifier, and a detector. A composite video signal including synchronizing signals and an intercarrier sound signal are derived in the detector. As the components heretofore described may be of any desired construction, further elaboration of this portion of the receiver is believed unnecessary.

The composite video signal including synchronizing signals and the intercarrier sound signal from the detector in block 10 is coupled through capacitor 12 to the control grid 14 of a pentode type electron discharge device 16. The control grid 14 is connected to ground potential through grid-leak resistor 18. The suppressor grid 20 and cathode 22 of device 16 are connected to ground potential through a biasing resistor 24 which is shunted by a capacitor 26. The anode 28 of tube 16 is connected to the positive terminal B+ of a source of unidirectional potential through a coil 30 and capacitor 32 in parallel, this combination being series-connected with a coil 34 and a resistor 36 in parallel, this latter combination being series-connected with a coil 38, and with coil 38 being series-connected with series-connected resistors 40 and 42. The anode 28 is also connected to a positive terminal B+ of the source of unidirectional potential through coil 30 and capacitor 32, coil 34 and resistor 36, all of which are series-connected with a resistor or potentiometer 43. The anode 28 of tube 16 is further connected through a coupling capacitor 44 to the sound system of the receiver wherein the audio signal portion of the composite television signal is derived and reproduced. The junction of resistors 40 and 42 is connected to the synchronizing system of the receiver wherein the synchronizing signals are separated from the video signal. These synchronized pulses are used to synchronize scanning systems which are provided for a cathode ray picture tube image reproducing device 45. As the sound, synchronizing, and scanning systems may be of any standard construction and operate in the usual manner they are not illustrated herein.

The resistor or potentiometer 43 has an adjustable tap or contrast control 46 thereon which is connected through coupling capacitor 48 to the cathode 50 of the cathode ray picture tube 45. The tap 46 of potentiometer 43 is also connected to the control grid 52 of a triode type of electron discharge device 54 through coupling capacitor 48 series-connected with capacitor 56. The control grid 52 of device 54 is connected to ground potential through a resistor 58 shunted by a capacitor 60. The capacitors 56 and 60 act as a capacitance voltage divider. The cathode 62 of device 54 is connected to ground potential through a resistor 64 shunted by a capacitor 66. The anode 68 of device 54 is connected to the positive terminal B+ of a source of unidirectional potential through a series peaking coil 70 series-connected with a load resistor 72. The junction of coil 70 and load resistor 72 is connected to the control grid 74 of the cathode ray picture tube 45 through a coupling capacitor 76. The control grid 74 is also connected to ground potential through a resistor 78. The cathode 50 of picture tube 45 is also connected to a brightness control network of well-known construction and comprising a resistor 80 which is connected to the adjustable tap of a potentiometer 82 which, in turn, is connected between the positive terminal B+ of a unidirectional potential source and ground potential.

In constructing the above-described circuit, the following are representative values of the circuit parameters:

| | | |
|---|---|---|
| Capacitor 12 | microfarads | 0.01 |
| Resistor 18 | megohms | 1 |
| Resistor 24 | ohms | 120 |
| Capacitor 26 | microfarads | 0.0022 |
| Capacitor 32 | micromicrofarads | 56 |
| Resistor 36 | ohms | 5600 |
| Coil 38 | microhenries | 350 |
| Resistor 40 | ohms | 2700 |
| Resistor 42 | do | 2700 |
| Resistor 43 | do | 15000 |
| Capacitor 48 | microfarads | 0.1 |
| Capacitor 56 | micromicrofarads | 15 |
| Resistor 58 | megohms | 1 |
| Capacitor 60 | micromicrofarads | 82 |
| Resistor 64 | ohms | 100 |
| Capacitor 66 | microfarads | 0.002 |
| Coil 70 | microhenries | 250 |
| Resistor 72 | ohms | 5600 |
| Capacitor 76 | microfarads | 0.047 |
| Resistor 78 | ohms | 100,000 |
| Resistor 80 | do | 330,000 |
| Resistor 82 | do | 100,000 |

The above-recited values were utilized in circuits found to be satisfactory, but is to be understood that they are merely representative of one circuit constructed in accordance with the invention, and the invention is not restricted to these values alone. Also, it will be understood that a different voltage divider other than the capacitance voltage divider comprising the capacitors 56 and 60 may be utilized to couple the output of the device 16 to the device 54 without departing from the scope of the invention.

The operation of the circuit will now be described. The intermediate frequency carrier is demodulated by the detector of block 10 to provide a composite video signal across resistor 18. The composite video signal is negative with respect to ground and contains negative going synchronizing pulses and positively going video components corresponding to increases in picture brightness. The composite signal is applied through the coupling condenser 12 to the control grid of the device 16. A negatively going video signal will therefore be provided at the anode 28 of the device 16. This negatively going signal is coupled to the cathode 50 of the picture tube 45, and also through the voltage divider comprising the capacitors 56 and 60 to the control grid 52 of the device 54. Thus the peak-to-peak value of the signal applied to the control grid 52 will be small in relation to the peak-to-peak value of the signal applied to the cathode 50. This negatively going signal appears as a positively going signal at the anode 68 of device 54. The positively going signal appearing at the anode 68 of device 54 is then coupled to the control grid 74 of the picture tube 45. The picture tube 45 is therefore seen to be modulated in a push-pull fashion.

The coil 30 and capacitor 32 act as a trap for the intercarrier sound portion of the video output of device 16. Thus the trap may be tuned to resonate at the intercarrier beat frequency thus serving to block the application of this frequency to the picture tube 45 and to the device 54. Series peaking coils 34 and 70 and shunt peaking coil 38 are provided for frequency compensation near the high frequency limit of the desired passband of the video output stage. By taking the intercarrier sound signal from the output of device 16 and by preventing this signal from reaching device 54, the linearity requirement of device 54 is substantially reduced.

In the video output circuit, for the electron discharge devices 16 and 54, a combination pentode-triode like the 6BH8 can be used to advantage. The output of the first device 16 is substantially flat up to 2.7 megacycles; the input to the second device 54 is therefore substantially flat up to 2.7 megacycles, except for very low frequencies. The output of the second device 54 is made substantially flat up to 2.7 megacycles by the use of series peaking coil 70 and a partial by-pass of the cathode resistor 64 by the capacitor 66. The specific embodiment of our invention as set forth in the drawing has been constructed and tested. The system operating at a supply voltage of 125 volts was found to have a gain of 25 times, a 3 db bandwith at 3 megacycles, a sound attenuation of greater than 40 db, and a peak-to-peak video output of approximately 110 volts without excessive nonlinearity distortion or cross-modulation of the sound signal. In this embodiment, vertical retrace blanking was applied to the screen or first anode of the picture tube.

From the foregoing description, it can be appreciated that the invention provides a video output stage permitting a peak-to-peak video output voltage with a minimum of distortion that may exceed the plate supply voltage. The first video amplifier may be used for amplification of the intercarrier sound signal with a minimum of cross-modulation, and additional sound attenuation is provided by the selectivity of the second video amplifier.

While the invention has been shown in one form, it will be obvious to those skilled in the art that it is not so limited, but is susceptible of various modifications without departing from the spirit and scope thereof.

We claim as our invention:

1. In a television receiver, a cathode ray picture tube having at least a cathode and a control electrode, and an output circuit for applying a video signal to said picture tube, said output circuit including first and second signal translating devices each having at least an output electrode and a control electrode, means for applying a positively going video signal in which the signal voltage increases in the positive direction as picture brightness increases to said control electrode of said first signal translating device, a first load circuit connected between said output electrode of said first signal translating device and a source of direct-current potential, a first coupling circuit means connected between said first load circuit and the cathode of said picture tube for coupling negative going video signal to said cathode, a second coupling circuit means connected between said first load circuit and said control electrode of said second signal translating device for applying video signal to vary the potential of said control electrode in inverse relation to picture brightness, a second load circuit connected between said output electrode of said second signal translating device and said source of direct-current potential, and third coupling circuit means connected between said second load circuit and the control electrode of said picture tube for applying amplified video signals to said control electrode in phase opposition to the signals applied to the cathode.

2. In a television receiver, a cathode ray picture tube having a cathode and a control electrode, an output circuit for applying a video signal to said picture tube, said output circuit including first and second electron discharge devices each having a cathode, an anode and a control electrode, means for applying a positively going video signal in which signal voltage varies directly as picture brightness to said control electrode of said first electron discharge device, a first load circuit connected between said anode of said first electron discharge device and a source of direct-current potential, a first coupling capacitor connected between said first load circuit and the cathode of said picture tube, variable impedance means for applying a direct-current bias to the cathode of said picture tube, voltage divider means coupled between said anode of said first electron discharge device and said control electrode of said second electron discharge device for varying the potential thereof inversely as picture brightness, a second load circuit connected to said anode of said second electron discharge device, and a second coupling capacitor coupled between said anode of said second electron discharge device and said control electrode of said picture tube for applying amplified video signals to said control electrode in phase opposition to the signals applied to the cathode, and cathode bias circuit means individually connecting the cathodes of said first and second discharge devices to the negative terminal of said direct-current source.

3. In a television receiver the combination with a cathode ray tube having a cathode and a control electrode, demodulating means for providing a composite video frequency signal including video intelligence components, and synchronizing components; first and second electron discharge devices each having a cathode, an output electrode and a control electrode, circuit means coupled to said demodulating means for applying a positively going video signal component of said composite signal to the control electrode of said first device; a source of direct-current potential having positive and negative terminals with said negative terminal being connected to a point of reference potential; first load impedance means connected between said positive terminal and the output electrode of said first discharge device; a coupling capacitor connected between said load impedance and the cathode of said picture tube for applying said video intelligence signals as amplified and translated by said first device to modulate the potential of said cathode inversely as a function of picture brightness; voltage divider means connected between said cathode and said point of reference potential and having an intermediate terminal connected to the control electrode of said second discharge device for applying a predetermined fractional portion of said amplified video signals to said control electrode; second load impedance means connected between the output electrode of said second discharge device and said positive terminal, and a coupling capacitor connected between said second load impedance means and the control electrode of said cathode ray tube for applying amplified video intelligence signal to said control electrode in phase opposition to the signals applied to the cathode whereby the cathode ray produced by said tube is intensity modulated by a peak-to-peak video voltage substantially exceeding the potential of said direct-current source.

References Cited in the file of this patent

UNITED STATES PATENTS

| | | |
|---|---|---|
| 2,289,948 | Wilson | July 14, 1942 |
| 2,533,081 | Anderson | Dec. 5, 1950 |
| 2,537,807 | Anderson | Jan. 9, 1951 |
| 2,688,712 | Proctor | Sept. 7, 1954 |
| 2,796,520 | Kreithen | June 18, 1957 |